Feb. 9, 1932.                H. W. MEYER                1,844,259
                         HOSE RACK AND NOZZLE
                           Filed May 6, 1929
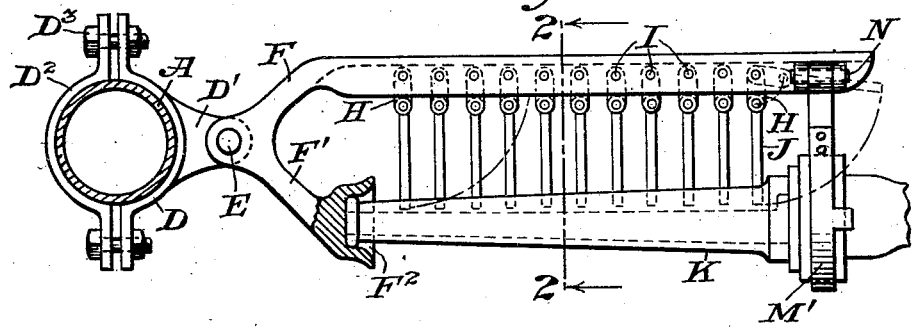
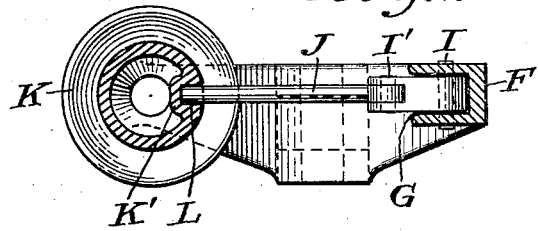
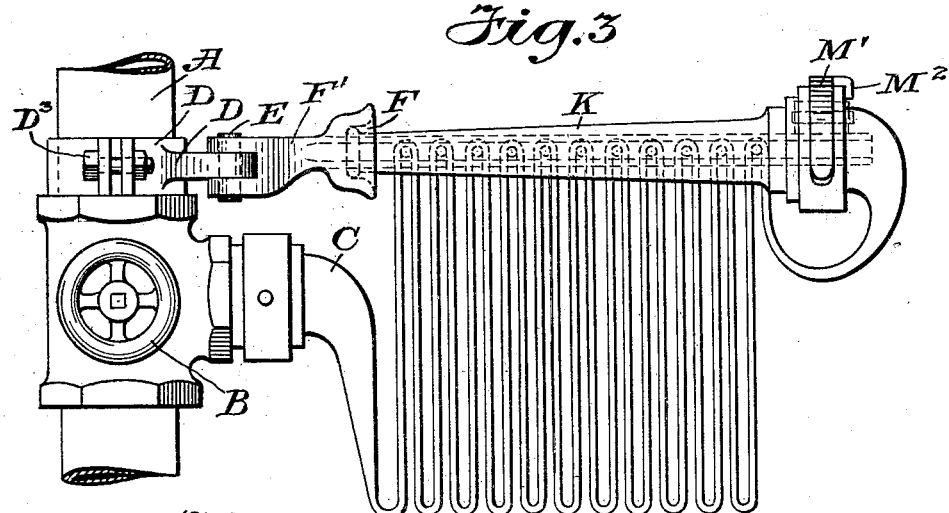
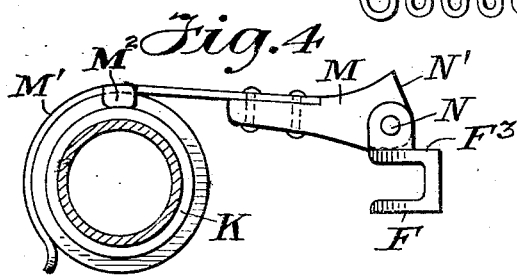
INVENTOR
Henry W. Meyer
BY
Frank H. Ashley
HIS ATTORNEY Patented Feb. 9, 1932

1,844,259

UNITED STATES PATENT OFFICE

HENRY W. MEYER, OF BROOKLYN, NEW YORK

HOSE RACK AND NOZZLE

Application filed May 6, 1929. Serial No. 360,722.

My invention relates to hose racks and nozzles.

The object of my invention is to provide a novel hose rack and nozzle adapted for use in buildings.

The principal object of my invention is to provide a rack having rack-rods which support both the rack and nozzle, and mounted to swing on a support mounted on the water supply pipe of the water supply system.

A further object is to mount the nozzle in such a manner as to be very quickly detached from the rack.

A further object is to provide means whereby the rack-rods may swing in the direction of the movement of the hose as it is drawn from the rack-rods, and may also be moved longitudinally in unison with the nozzle in the act of disengaging the nozzle from the rack and a nozzle support element carried by a branch portion of the frame.

The further object and advantages of the new construction will be described in the following description. Referring to the drawings which form a part of this specification, Fig. 1 is a plan view of a rack and nozzle, shown partly in section, and embodying my invention.

Fig. 2 is a cross section of the rack and nozzle, taken on line 2—2 of Figure 1.

Fig. 3 is a side elevational view of the construction shown in Figure 1.

Fig. 4 is a side view of a swinging clamp used to support the hose and nozzle.

A— indicates the water supply pipe and B— a valve having an outlet to the hose C—. D— indicates a bracket held firmly to the pipe A— by a strap $D^2$— and bolts $D^3$. The bracket portion D— is provided with a laterally extending portion D'— having a hole therein through which a pin E— extends to hold and support the rack-frame F— and a branch F'— formed integral therewith in swinging relation to the portion D'.

I prefer to form the rack-frame with a longitudinally extending channel G— having a depth substantially that of the length of the links H— which are connected to the rack-frame in pivotal relation thereto by pins I. Pins I'— extend thru the opposite ends of the links and hold the rack-rods J— in swinging relation thereto.

The hose nozzle K— is formed with thickened wall portions on one inner side thereof to provide a longitudinally extending rib K'— and holes L— are drilled in the outer side of the nozzle which extend into said rib to receive the free ends of the rack-rods which fit closely therein and assist in supporting the nozzle in position as illustrated.

The nozzle is further supported at its small end by the branch portion F'— which is provided with a recess $F^2$— formed substantially as shown, which construction relieves the rack-pins from the weight of the nozzle at this end. The nozzle is further supported and held on the ends of the rack-rods by a swinging clamp M, which is hinged to the rack-frame F— at N—, and is provided with a flat end N'— which rests on the top of the rack-frame at $F^3$—, when in its unlocked position.

The clamp M— comprises a flat band portion M'— of spring steel or other suitable metal which is bent to snap under the shank of the nozzle as shown in Figure 4, to clasp and hold the nozzle on the rack-rods and to assist in carrying the weight of the nozzle and hose, and also to prevent longitudinal movement of the nozzle relative to the rack portion F— when in locked relation as illustrated in Figure 1. The spring portion M'— comprises a downwardly extending side piece $M^2$ which abuts the end of the nozzle to further insure against said longitudinal movement.

The hose is supported by the rack-rods as illustrated, a portion being looped over each rack-rod.

In operating the device, the clamp M— is released by pulling outward on the free end of the spring portion M'— and swinging it to its position of rest on the top of the rack-frame F— where it will rest on its base N'.

The nozzle is then moved laterally, the links H, permitting this action, after which the nozzle is detached from the rack-rods by an outward pull, and as the nozzle is carried in the desired direction, the rack-rods will swing in releasing the hose to permit it to leave the rods smoothly.

It is obvious that the details of construction may be modified, and I, therefore, do not wish to be limited in such changes as may be required to meet particular conditions of installation and use, but reserve the right to modify the construction within the scope of the claims allowed.

Having thus described my invention I claim as new:

1. A hose-rack comprising a bracket, a frame supported by said bracket in swinging relation thereto, rack-rods carried by said frame in swinging relation thereto, a nozzle for supporting the rods having openings into which the ends of said rack-rods extend, and means carried by said frame for holding said nozzle in separable relation thereto.

2. As stated in claim 1, said means for supporting said nozzle comprising a swinging clasp member the free end of which is formed of spring material which extends over one end of the nozzle and serves to prevent movement thereof relative to the frame.

3. A hose-rack comprising a supporting bracket, a frame hinged thereto, links and rack-rods carried by said frame, a nozzle carried by said frame having holes into which said rack-rods extend, said frame having a branch constructed to support one end of said nozzle, and a spring clasp member constructed to support and hold the other end of said nozzle to said frame in detachable relation thereto.

4. A hose-rack comprising a supporting bracket, a frame carried thereby, rack-rods carried by said frame, a nozzle having an inner rib formed on one side thereof, holes extending through the wall of the nozzle into said rib to receive the free ends of said rack-rods, and means for holding said nozzle in detachable engagement with said rack-rods.

5. A hose-rack comprising a frame and rack-rods mounted thereon in swinging relation thereto, and a hose-nozzle supported at each end by said frame, in a horizontal position and engaged with the free ends of the rack-rods to hold them in spaced relation.

6. As stated in claim 5, and a bracket hinged to said frame and adapted to support the same.

7. A hose-rack comprising a frame and rack-rods mounted thereon in swinging relation thereto, a hose-nozzle supported at each end by said frame and serving to support the free ends of said rack-rods, and a bracket hinged to said frame and adapted to support the same.

8. A hose rack comprising an arm, a hose nozzle removably supported in spaced parallel relation to the arm and means engaged with the arm and nozzle providing a support for a hose between the arm and nozzle.

9. A hose rack comprising an arm, a hose nozzle removably supported in spaced parallel relation to the arm and means engaged with the arm and nozzle providing a support for a hose between the arm and nozzle and included rack-rods carried by the arm and adapted to be engaged by the nozzle.

10. A hose rack comprising an arm, a hose nozzle removably supported in spaced parallel relation to the arm and means engaged with the arm and nozzle providing a support for a hose between the arm and nozzle, and including rack rods pivotally carried by the arm with the free ends of the rack rods adapted to be interlockingly engaged by the nozzle.

11. A hose rack comprising an arm, a hose nozzle removably supported in spaced parallel relation to the arm and means engaged with the arm and nozzle providing a support for a hose between the arm and nozzle, and including rack rods pivotally carried by the arm with the free ends of the rack rods adapted to be interlockingly engaged by the nozzle, and a latch device on the arm engageable with the nozzle for holding the same in position on the arm.

In testimony whereof I have affixed my signature.

HENRY W. MEYER.